July 5, 1927.
C. T. WEYMANN
1,634,861
OPERATING APPARATUS FOR VERTICALLY SLIDING PANELS
Filed Oct. 1, 1923
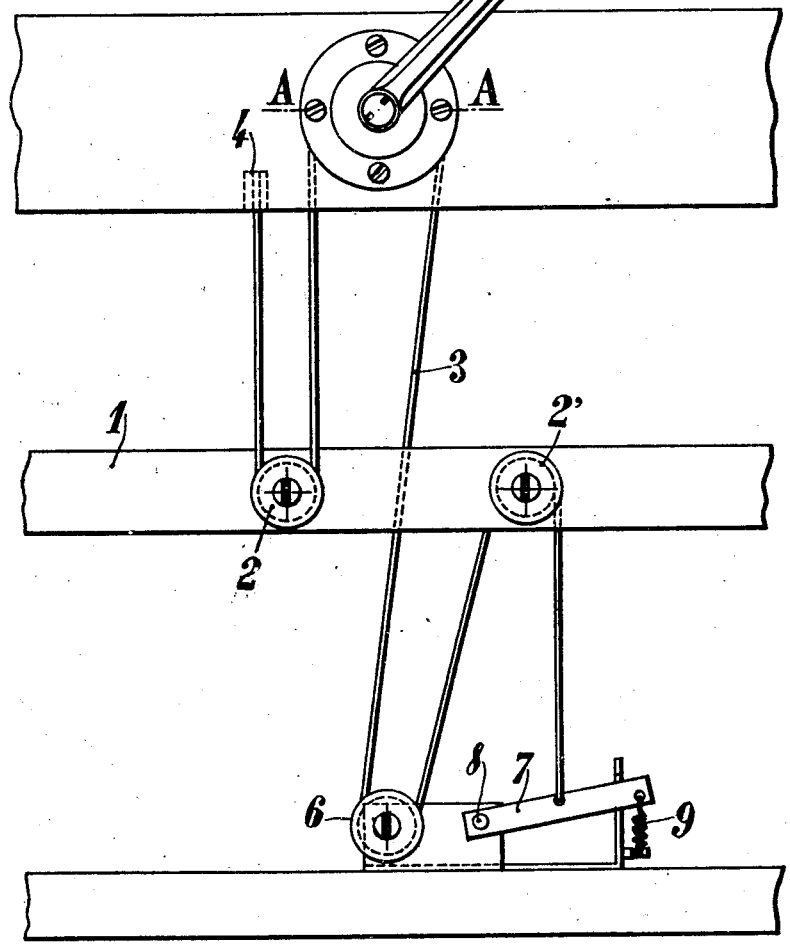
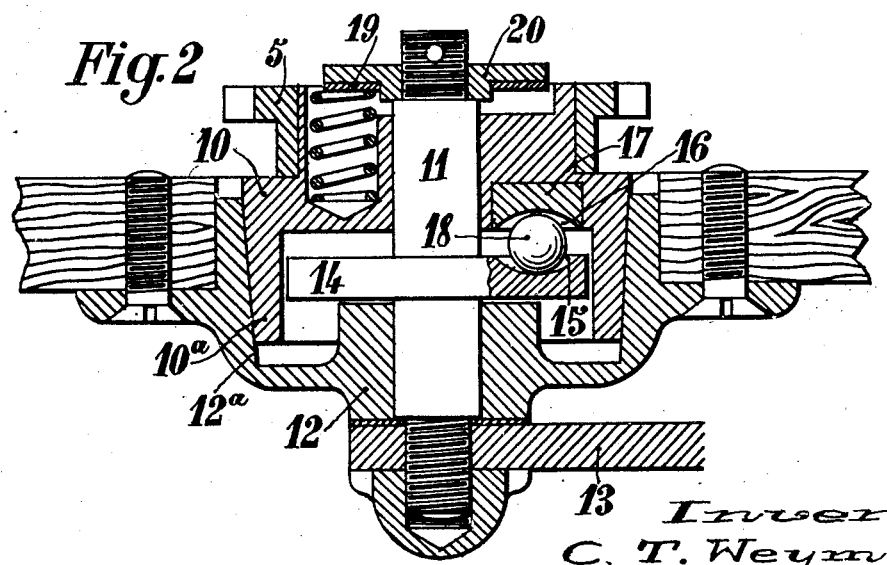
Inventor
C. T. Weymann
By Marks & Clerk Attys.

Patented July 5, 1927.

1,634,861

UNITED STATES PATENT OFFICE.

CHARLES TORRES WEYMANN, OF PARIS, FRANCE.

OPERATING APPARATUS FOR VERTICALLY-SLIDING PANELS.

Application filed October 1, 1923, Serial No. 666,045, and in France May 4, 1923.

The present invention relates to an operating apparatus for vertically sliding panels.

This apparatus is particularly adapted to permit: (1) the automatic braking and immobilization in position of the panel as soon as the driving action ceases. (2) when the driving action is again exerted, to automatically produce the release of the panel before determining its movement.

For that purpose, the apparatus is characterized in that the panel is connected by a flexible bond to a pulley having a braking surface which is constantly pressed by a resilient member against a corresponding fixed surface the pulley being in contact with the driving member through such surfaces that any rotation of the pulley first determines the release of the pulley, then its movement of rotation, the said pulley being automatically relocked as soon as the driving action ceases by the resilient member which acts on the same.

The accompanying drawing illustrates, by way of example only, a form of carrying out the invention.

Fig. 1 is a diagrammatic elevation.

Fig. 2 is a section according to A—A.

The example illustrated relates to a plate glass of a motor vehicle or the like, the cross bar of which forming a lower support 1 carries two transmission pulleys 2 and 2' for the chain or other flexible bond 3, which is secured at 4 on the carriage body. This chain 3 passes on the pulley 2, then on a pulley 5 (Fig. 2) belonging to a lifting system, on a lower transmission pulley 6 the axis of which is integral with the carriage body, on the pulley 2' and is finally attached to the arm 7 pivoted at 8 and subjected to the action of a spring 9 which holds the chain 3 taut.

The pulley 5 of the lifting system is frictionally mounted on a sleeve 10 loose on the axis 11 carried by the cap 12 rigid with the carriage body. On the said axis 11 is rigidly secured an actuating crank 13 and it carries a plate 14 provided with spherical recesses 15; the inner surface of the sleeve 10 is also provided with spherical recesses 16 formed in a bearing or step 17 mounted on the said sleeve. Balls 18 are interposed between the recesses 15 and 16. On the other hand, springs 19 act between a plate 20, screwed on the axis 11, and the sleeve 10, so that the braking surface 10ª of this sleeve (surface which is conical in the example illustrated but, which, obviously, may have any shape) is always pressed against the corresponding surface 12ª of the cap 12, so as to produce the locking of the pulley 5.

When the crank 13 is acted upon, the axis 11 rotates until the balls 18 are clamped between the spherical surfaces 16 and 15. From this moment, any subsequent rotation of the axis 11 results in the exertions of two stresses on the sleeve; one of which tends to cause the sleeve 10 to slide on its axis, the other to rotate this sleeve. As, at the beginning, the adherence of the surfaces 10ª and 12ª is great, the sleeve does not rotate, but moves in translation according to its axis until the adherence has sufficiently diminished for permitting the rotation of the sleeve. In other words, the sleeve 10 is first released, then participates to the rotation of the axis 11.

If the driving action ceases, the springs 19 act for producing again the locking of the sleeve 10.

It will therefore be seen that the plate glass is automatically immobilized in the position where it was placed at the moment one ceases to act.

Owing to the fact that the chain 3 is constantly stretched by the spring 9, no floating of this chain is possible, that is to say the system does not produce any noise upon displacement of the vehicle.

The form of construction described is obviously capable of modifications; for instance, as already indicated, the braking surfaces may not be conical and the number of balls used may vary according to circumstances.

Substantially, the axes of these balls and of the springs form a regular polygon, two consecutive apices being occupied, one by a ball, the other by a spring, so as to distribute the pressures. Of course, these modifications which do not alter in any way the principle and operation and which are applicable to all kinds of vertically sliding panels, are included in the scope of the invention.

What I claim as my invention and desire to secure by Letters Patent is:

1. In a window raising and lowering device, the combination of a frame, an axle supported by the frame, a crank for rotating said axle, a plate movable with said axle and having semi-spherical cups therein, a wheel mounted loosely on said axle and having an annular friction member, said wheel having semi-spherical cups corresponding to those of the plate, balls interposed between the plate and wheel and resting in said cups, a friction member fixed to the frame and engaging the wheel for preventing accidental rotation of the wheel, and springs for forcing the friction members together.

2. In a window raising and lowering device, the combination of a frame, an axle supported by the frame, a crank to rotate said axle, a plate integral with said axle and provided with semi-spherical cups, a wheel loosely mounted on said axle, said wheel being provided with semi-spherical cups corresponding to those of the plate, balls interposed between the plate and wheel and resting in said cups for moving the wheel axially away from the plate when the axle is rotated, a friction member affixed to the frame and engaging said wheel for preventing accidental rotation of the latter, an abutment member affixed to the axle, and resilient means arranged between the abutment member and the wheel to force the latter against the friction member.

3. In a window raising and lowering device, a frame, an axle supported thereby, a wheel mounted loosely on the axle, a friction member fixed to the frame and provided with a frustro conical bore, a frustro conical element rigidly connected to the wheel and frictionally engaging the surface of said bore to prevent accidental rotation of the wheel, resilient means for forcing said element into said bore, and means for rotating said wheel including elements adapted to exert an axial pressure on the wheel sufficient to counterbalance the pressure exerted by the resilient means and thus reduce the friction between the frustro conical element and said bore to permit the wheel to readily turn.

4. A window raising and lowering device as claimed in claim 3 in which the wheel is rotatably and axially movable on the axle, said last mentioned means including a plate movable with the axle, semi-spherical cups provided in opposed faces of the wheel and plate, balls arranged in said cups, and means to permit an operator to turn said axle.

In testimony whereof I have signed my name to this specification.

CHARLES TORRES WEYMANN.